(12) United States Patent
Elford et al.

(10) Patent No.: US 11,204,650 B2
(45) Date of Patent: *Dec. 21, 2021

(54) METHOD, APPARATUS AND SYSTEM FOR INTERACTING WITH CONTENT ON WEB BROWSERS

(71) Applicant: Intel Corporation, Santa Clara, CA (US)

(72) Inventors: Christopher L Elford, Hillsboro, OR (US); Howard P. Tsoi, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/067,340

(22) Filed: Oct. 9, 2020

(65) Prior Publication Data

US 2021/0026456 A1 Jan. 28, 2021

Related U.S. Application Data

(63) Continuation of application No. 15/395,857, filed on Dec. 30, 2016, now Pat. No. 10,802,595, which is a
(Continued)

(51) Int. Cl.
*G06F 3/0481* (2013.01)
*G06F 3/01* (2006.01)
(Continued)

(52) U.S. Cl.
CPC ............ *G06F 3/017* (2013.01); *G06F 3/0481* (2013.01); *G06F 3/04842* (2013.01);
(Continued)

(58) Field of Classification Search
CPC ........ G06F 3/017; G06F 16/957; G06F 16/95; G06F 3/04842; G06F 3/0481;
(Continued)

(56) References Cited

U.S. PATENT DOCUMENTS 6,282,512 B1 8/2001 Hemphill
7,797,447 B1 9/2010 Schilit et al.
(Continued)

FOREIGN PATENT DOCUMENTS

CN 101901050 A 12/2010
EP 1394692 A1 3/2004
(Continued)

OTHER PUBLICATIONS

Firebug: Web Development Evolved, obtained at: <http://getfirebug.com> obtained on Dec. 17, 2010, 4 pages.
(Continued)

*Primary Examiner* — Jeanette J Parker
(74) *Attorney, Agent, or Firm* — Schwabe, Williamson & Wyatt, P.C.

(57) ABSTRACT

A method, apparatus and system enable indirect remote interaction with a web browser. In one embodiment, remote user gestures may be captured and processed to determine an action to be taken by the web browser.

25 Claims, 14 Drawing Sheets

Related U.S. Application Data continuation of application No. 12/978,082, filed on Dec. 23, 2010, now Pat. No. 9,575,561.

(51) Int. Cl.
  *G06F 16/95* (2019.01)
  *G06F 3/0484* (2013.01)
  *G06F 16/957* (2019.01)

(52) U.S. Cl.
  CPC ............ *G06F 16/95* (2019.01); *G06F 16/957* (2019.01); *G06F 2203/0381* (2013.01)

(58) Field of Classification Search
  CPC ............ G06F 2203/0381; G06F 3/013; G06F 3/0304; G06F 3/14
  See application file for complete search history.

(56) References Cited

U.S. PATENT DOCUMENTS

| | | | |
|---|---|---|---|
| 7,848,542 | B2 | 12/2010 | Hildreth |
| 7,975,020 | B1 | 7/2011 | Green et al. |
| 2004/0119741 | A1 | 6/2004 | Teng et al. |
| 2004/0205568 | A1 | 10/2004 | Breuel et al. |
| 2005/0050024 | A1 | 3/2005 | Ellis et al. |
| 2006/0010400 | A1 | 1/2006 | Dehlin et al. |
| 2008/0189593 | A1* | 8/2008 | Baker ............... H04L 67/34 715/207 |
| 2009/0044098 | A1 | 2/2009 | Wyler et al. |
| 2009/0073117 | A1* | 3/2009 | Tsurumi ............ G06F 3/0481 345/158 |
| 2009/0217211 | A1 | 8/2009 | Hildreth et al. |
| 2009/0228841 | A1 | 9/2009 | Hildreth |
| 2010/0107054 | A1* | 4/2010 | Park ............... G06F 3/04842 715/234 |
| 2010/0251189 | A1 | 9/2010 | Jaeger |
| 2011/0078557 | A1 | 3/2011 | Seolas et al. |
| 2011/0113346 | A1 | 5/2011 | O'Shaugnessy et al. |
| 2011/0197161 | A1* | 8/2011 | Mattingly ......... G06F 3/04842 715/810 |
| 2012/0092381 | A1 | 4/2012 | Hoover et al. |
| 2012/0151420 | A1 | 6/2012 | Amento et al. |
| 2012/0311470 | A1 | 12/2012 | Roberts et al. |
| 2013/0254646 | A1 | 9/2013 | Amacker et al. |
| 2013/0254647 | A1 | 9/2013 | Amacker et al. |
| 2013/0254648 | A1 | 9/2013 | Amacker et al. |

FOREIGN PATENT DOCUMENTS

| | | |
|---|---|---|
| EP | 1615109 A2 | 1/2006 |
| EP | 2244166 A2 | 10/2010 |
| JP | 2006-40271 A | 2/2006 |
| KR | 10-2010-0045868 | 5/2010 |
| KR | 100978929 B1 | 8/2010 |
| TW | 200511050 A | 3/2005 |
| TW | 201007510 A | 2/2010 |
| WO | 2009/142866 A1 | 11/2009 |

OTHER PUBLICATIONS

CES 2010 Demo Lenovo ideapad S10 3T Multi-touch Netbook (Net Books Point: A Complete Store for Notebooks), obtained at: <http://www.netbookspoint.com/netbooks/lenovo-netbook/ces-2010-demo-lenovo-ideapad-s10-3t-multi-touch-netbook.html> obtained on Dec. 17, 2010, 6 pages.

Introducing Kinect for Xbox 360, obtained at <http://www.xbox.com/en-US/kinect?WT.srch=>, obtained on Dec. 21, 2010, 4 pages.

Engleman, Eric, "Making online orders with a nod or a smile? Bezos seeks patent", TechFlash, Seattle's Technology News Source, obtained at: <http://www.techflash.com/seattle/2010/06/making_online_orders_with_a_nod_or_a_smile_bezos_seeks_patent.html> obtained on Dec. 17, 2010, 2 pages.

The RedEye Turns Any iPhone Or iPod Touch Into A Universal Remote Control, Wikio News, obtained at <http://www.wikio.com/video/redeye-accelerometer-gestures-2228995> obtained on Dec. 17, 2010, 1 page.

Anthony Sebastian, "Control Firefox witha Nintendo Wiimote", Apr. 15, 2010, available at: <http://downloadsquad.switched.com/2010/04/15/control-firefox-with-a-nintendo-wiimote>, 1 page.

GestureTek, "About US", available at: <http://www.gestureteck.com/aboutus/corporatebackground.php>, obtained on Dec. 17, 2010, 2 pages.

http://www.nintendo.com/wii, obtained on Dec. 21, 2010, 2 pages.

International Search Report and Written Opinion dated Aug. 17, 2012 in PCT Application No. PCT/US2011/067211, 9 pages.

International Preliminary Report on Patentability dated Jul. 4, 2013 for PCT Application No. PCT/US2011/067211.

Office Action dated Feb. 4, 2014 from Japanese Application No. 2013-544884, 5 pages.

Translation of Office Action dated May 8, 2014 for Korean Application No. 10-2013-7016203, 4 pages.

Taiwan Search Report dated May 28, 2014 for Taiwan Patent Application No. 100147988, 18 pages.

Taiwan Office Action dated Apr. 1, 2015 for Taiwan Patent Application No. 100147988, 5 pages.

Chinese Office Action dated Mar. 29, 2015 for Chinese Application No. 201180061879.5, 8 pages.

Extended European Search Report dated Sep. 29, 2016 for European Patent Application No. 11852170.7, 10 pages.

J Vanderdonckt: "Multimodality for Plastic User Interfaces Models Methods and Principles," Multimodal User Interfaces, Jan. 1, 2008, Bedin, Heidelberg, 24 pages.

Extended European Search Report dated Mar. 2, 2020 for European Patent Application No. 20152770.2, 9 pages.

Office Action dated Mar. 18, 2019 for U.S. Appl. No. 15/394,857, 16 pages.

Final Office Action dated Aug. 20, 2019 for U.S. Appl. No. 15/394,857, 42 pages.

Office Action dated Aug. 1, 2012 for U.S. Appl. No. 12/978,082, 22 pages.

Final Office Action dated Feb. 19, 2013 for U.S. Appl. No. 12/978,082, 29 pages.

Office Action dated Jul. 30, 2013 for U.S. Appl. No. 12/978,082, 24 pages.

Final Office Action dated Dec. 18, 2013 for U.S. Appl. No. 12/978,082, 25 pages.

* cited by examiner

Gesture mapping in Gesture Library 125

Close tab

Web search

Stop

Follow link

Back

Top

Bottom

Bookmark

"Rotate back" close tab

"Swing" forward or back

"High swivel" web search

Code 500

```
<BODY scroll="yes" onload="javascript:if(typeof(_spBodyOnLoadWrapper) != 'undefined') _spBodyOnLoadWrapper();">
<form name="aspnetForm" method="post" action="default.aspx?InstanceID=3" onsubmit="javascript:return WebForm_OnSubmit();" id="aspnetForm">
<div>
<input type="hidden" name="MSO_PageHashCode" id="MSO_PageHashCode" value="1192704998?" />
<input type="hidden" name="MSOWebPartPage_PostbackSource" id="MSOWebPartPage_PostbackSource" value="" />
<input type="hidden" name="MSOTlPn_SelectedWpId" id="MSOTlPn_SelectedWpId" value="" />
<input type="hidden" name="MSOTlPn_View" id="MSOTlPn_View" value="0" />
<input type="hidden" name="MSOTlPn_ShowSettings" id="MSOTlPn_ShowSettings" value="False" />
<input type="hidden" name="MSOGallery_SelectedLibrary" id="MSOGallery_SelectedLibrary" value="" />
<input type="hidden" name="MSOGallery_FilterString" id="MSOGallery_FilterString" value="" />
<input type="hidden" name="MSOTlPn_Button" id="MSOTlPn_Button" value="none" />
<input type="hidden" name="__EVENTTARGET" id="__EVENTTARGET" value="" />
<input type="hidden" name="__EVENTARGUMENT" id="__EVENTARGUMENT" value="" />
<input type="hidden" name="__REQUESTDIGEST" id="__REQUESTDIGEST" value=",Jun 2010 18:05:45-0000" />
<input type="hidden" name="MSOSPWebPartManager_DisplayModeName" id="MSOSPWebPartManager_DisplayModeName" value="Browse" />
<input type="hidden" name="MSOWebPartPage_Shared" id="MSOWebPartPage_Shared" value="" />
<input type="hidden" name="MSOLayout_LayoutChanges" id="MSOLayout_LayoutChanges" value="" />
<input type="hidden" name="MSOLayout_InDesignMode" id="MSOLayout_InDesignMode" value="" />
<input type="hidden" name="MSOSPWebPartManager_OldDisplayModeName" id="MSOSPWebPartManager_OldDisplayModeName" value="Browse" />
<input type="hidden" name="MSOSPWebPartManager_StartWebPartEditingName" id="MSOSPWebPartManager_StartWebPartEditingName" value="false" />
<input type="hidden" name="__VIEWSTATE" id="__VIEWSTATE"
```

Code analyzer 505

Table 510

| hotspot# | action | type of action | tag |
|---|---|---|---|
| 1 | x | floatover | <id=xyz> |
| 2 | y | floatover | |
| 3 | z | | |

FIG. 5A

Gestures 700

METHOD, APPARATUS AND SYSTEM FOR INTERACTING WITH CONTENT ON WEB BROWSERS

CROSS-REFERENCE TO RELATED APPLICATION

This application is a continuation of U.S. application Ser. No. 15/395,857 filed Dec. 30, 2016, which is a continuation of U.S. application Ser. No. 12/978,082 filed Dec. 23, 2010, now U.S. Pat. No. 9,575,561, the contents of each of which are hereby incorporated by reference herein in their entireties for all purposes.

BACKGROUND

Personal computing technology and cellular telephone devices have changed radically over the past 10 years. Personal computing (PC) devices have become increasingly popular, quickly evolving into ever smaller form factors such as netbooks and tablets, with increased computing power. Simultaneously, the cellular telephone market has evolved into a personal information management device that includes email, texting and camera capabilities, rather than simply a voice communications device. As a result, both larger and smaller PC devices have become essential to consumers to conduct their day to day lives.

As these devices continue to proliferate the market and consumers become increasingly savvy, it has become evident that traditional PC-centric input schemes and PC-centric user interfaces are increasingly posing obstacles to a richer end user experience. As used herein, the phrase "PC-centric" refers to traditional PC-based platforms having a mouse, pen, touch screen or other such existing interfaces. Users are just as likely to want to utilize an application on a handheld smart phone or MID as a traditional PC-centric devices, thus posing a number of different challenges for application developers. Applications designed for larger footprint PCs, for example, have difficulty running (if they are able to run at all) on smaller form factors with lower computing power. For example, largely due to the form factor, mobile device applications typically have reduced and/or different functionality than similar applications available to PC-centric devices (e.g., devices with large screens, a mouse or other such device that controls a cursor on the screen, etc.). Handheld device application features are frequently "dumbed down" or condensed for handheld device, typically with reduced functionality.

The most common example of such an altered application is the typical web browser that runs on a hand held device. These browsers typically provide limited browsing ability because they are based on a PC-centric paradigm of utilizing an input device such as a keyboard, mouse, trackball and/or trackpad/touchpad, where a "cursor" (text or pointer) is moved around the screen. Alternatively, the current paradigm may accept touch screen input where a user may utilize a finger or a pen to provide input to the device. Touch screen technology was also designed within a PC-centric environment and as such, typically relies on a variety of PC-centric functionality. Without these types of PC-centric input devices, however, developers for browsers that run on handheld devices may be forced to adapt their application for hand held devices (typically by providing reduced functionality).

In addition to the functionality, the fundamental user interface of a PC-centric application may also have to be modified or redesigned in order to take into account the limited screen real estate and other limitations on handheld device. Referring back to the browser example, although the user interface of a browser on a handheld device may resemble the original browser on which it is based on a PC-centric platform, the handheld interface is typically simplified to compensate for the limitations of the handheld device. This factor, together with the significantly limited input schemes available on handheld devices, are quickly rendering existing PC-centric user interaction paradigms obsolete.

BRIEF DESCRIPTION OF THE DRAWINGS

The present invention is illustrated by way of example and not limitation in the figures of the accompanying drawings in which like references indicate similar elements, and in which:

FIG. 5A-5C illustrate an embodiment of the present invention;

DETAILED DESCRIPTION

Figure 1:
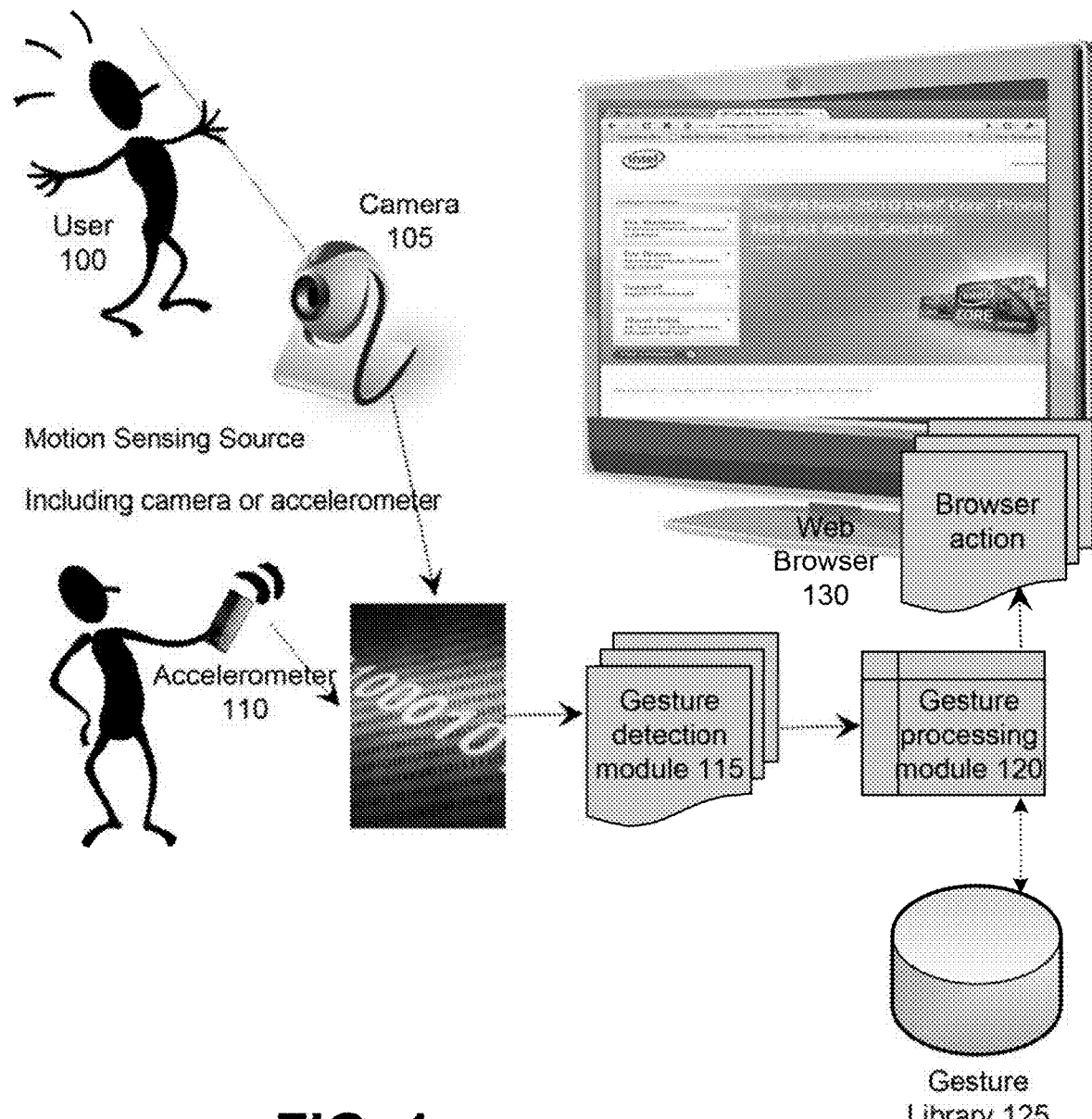
FIG. 1 illustrates an embodiment of the present invention.

Embodiments of the present invention provide users with a new paradigm for manipulating web browsers that is independent of traditional elements such as input devices and cursors. More specifically, embodiments of the present invention provide a method, apparatus and system for interacting with content on web browsers with gestures, without a need for traditional input devices and/or touch screens. "Gestures" as used herein refers to a variety of operations, including but not limited to movements of hands, eyes and/or another body part. For the purpose of simplicity, many of the examples herein may utilize hand gestures but embodiments of the invention are not so limited. As used in this specification, the phrases "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Additionally, reference in the specification to the term "device", "machine" or "apparatus" may include any one of a number of single or multi-processor based computing devices, including but not limited to servers, desktop computing devices, portable computing devices (including laptops, notebooks, netbooks and handhelds), set-top boxes, and game consoles. Handheld devices may include, but are not limited to, cell phones, smart phones, personal digital assistants (PDAs), mobile internet devices (MIDs), laptops, digital cameras, media players, ultra mobile personal computers (UMPCs) and/or any computing device that is capable of roaming on, and connecting to, a network.

Embodiments of the present invention enable users to enjoy a customized interactive experience with web browsers, regardless of platform or size. More specifically, embodiments of the present invention enable users to interact with web browsers utilizing gestures, independent of external physical input devices as well as independent of the need for physical touch on an input screen or display device. Embodiments of the invention may be adapted for implementation on a variety of platforms without departing from the spirit of the invention.

According to one embodiment of the invention, users may perform web browsing actions by utilizing gestures. In one embodiment, a gesture input scheme may comprise a motion sensing source comprising at least one of an accelerometer and a camera, a gesture detection module and a gesture processing module. The motion sensing source, gesture detection module and gesture processing module may be implemented as separate components and/or be combined in a variety of ways without departing from the spirit of embodiments of the present invention. Thus, for example, in one embodiment, the motion sensing source may be combined with the gesture detection module into a single component. In an alternate embodiment, gesture detection module and gesture processing module may be combined into a single component. For the purposes of simplicity, the following descriptions discuss the functionality of each module separately. In various embodiments, the functionality of the modules remains the same, regardless of how they are combined (or not) for implementation.

The motion sensing source may identify a motion made by a user (e.g., a hand motion, an eye motion, body motion, etc.) and capture the motion data. The gesture detection module may thereafter determine that the motion data relates to a specific movement and is not a motion event to be passed on to the platform. In other words, the gesture detection module determines that this is a gesture to provide input to the device rather than simply a movement of the device. This movement may be provided to the gesture processing module, which in turn may translate the movement to determine the action that the user is attempting to perform within the web browser.

Various motion detection technologies exist today and may be utilized with embodiments of the present invention without departing from the spirit of the invention. Examples of such motion detection technologies are frequently used in game platforms. For example, Nintendo® Corporation's Wii game platform includes accelerometers in the Wii's remote control. The accelerometer in the Wii's remote control identifies the motion, the direction of the motion and rate information, which coupled with a transceiver on the base Wii unit, enable a user's actions to be mimicked on the screen. Similarly, Microsoft® Corporation's recent release of the Kinect utilizes a camera to detect user motion that is then replicated within the game. There are also various other non-game products from companies such as GestureTek® that take advantage of camera-enabled gesture-recognition technology for a variety of uses.

Embodiments of the present invention leverage these existing motion detection technologies to provide an enhanced motion based input scheme for web browsing. Specifically, embodiments of the present invention utilize a camera and/or accelerometer or both to sense and capture gestures, confirm that the gestures are intended as input to a web browser, and translate the gestures into an indicator of specific actions that the user desires to take on a web browser. Thus, for example, in one example, a user may perform a full hand grab motion to zoom into a screen region of a web browser. According to this embodiment, a camera and accelerometer (together comprising a motion sensing source) may provide a data stream of the action to a component that is doing gesture detection (gesture detection module).

In one embodiment, the gesture detection module may be a component of the operating system on the platform and may identify that the movement is not a motion event recognized by the operating system. The gesture detection module may thereafter determine that the motion is intended as a gesture for input to the web browser and provide the motion to the gesture processing module. The gesture processing module may then translate the motion into an action understandable by a web browser component and inform the browser of the action. In one embodiment, this process of translation may utilize a gesture library that correlates a specific gesture to a particular browser action. Once translated to the appropriate browser action and sent to the browser, the browser may perform the action intended by the user.

In the present example, the camera may capture the full hand grab and stream it to the gesture detection module. The gesture detection module may receive the motion of the full hand grab from the data stream and determine that it is intended as input. The gesture detection module may then inform the gesture processing module that the motion is a full hand grab. The gesture processing module may thereafter determine what action the full hand grab motion translates to by examining a repository of gestures and upon determining that it is a "zoom" request, inform the browser to zoom to the appropriate region on the web browser screen. The web browser may then follow through with the zoom and provide the user with the end result they desired.

FIG. 1 illustrates an example of an embodiment of the present invention. As illustrated, a user may perform a motion. A motion sensing source (Camera 105 and Accelerometer 110 collectively) coupled to a computing platform (Computing Platform 100), may identify and capture the full hand grab motion and provide a motion data stream of the action to Gesture Detection Module 115. Gesture Detection Module 115 may examiner the motion and confirm that it is not a motion event to be passed on to the operating system on Computing Platform 100. Gesture Detection Module 115 may then determine that the motion is a gesture meant as input to the web browser and Gesture Detection Module 115 may then provide that information to Gesture Processing Module 120.

Upon receipt of the gesture information from Gesture Detection Module 115, Gesture Processing Module 120 may examine the gesture information and process the information against a translation store (Gesture Library 125). In one embodiment of the invention, the translation store includes a mapping of different user gestures and specific actions to be performed on a web browser. In this example, Gesture Processing Module 120 may determine that the full hand grab motion translates to a "zoom" request from the user. Gesture Processing Module 120 may thereafter send Web Browser 130 a request to zoom per the user's request.

According to an embodiment of the invention, Gesture Detection Module 115 may be implemented as an extension of the operating system running on Computing Platform 100, but embodiments of the invention are not so limited.

Similarly, Gesture Processing Module 120 may be implemented as an extension of Web Browser 130 but embodiments of the invention are not so limited. In alternate embodiments, Gesture Processing Module 120 may be an independent module couple to Web Browser 130.

Figure 2:
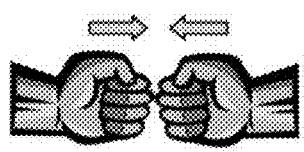
FIG. 2 illustrates a set of information in a translation store according to an embodiment of the present invention.
Figure 2:
Figure 2:
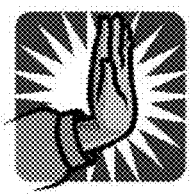
Figure 2:
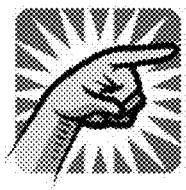
Figure 2:
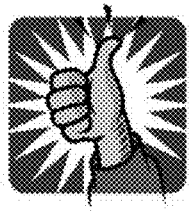
Figure 2:
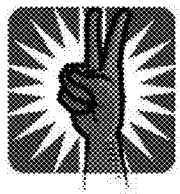
Figure 2:
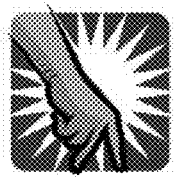
Figure 2:
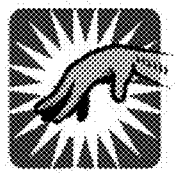

FIG. 2 illustrates an example of information stored in Gesture Library 125 according to embodiments of the present invention. More specifically, FIG. 2 illustrates various actions that may be translated by the Gesture Processing Module. For example, per the description of FIG. 1 above, if the user gestures both fists coming together, the movement may be captured by Camera 105 and Accelerometer 110, provided to Gesture Detection Module 115 to identify the motion as a gesture, then relayed to Gesture Processing Module 120. Gesture Processing Module 120 may compare the gesture against a list of gestures in Gesture Library 125. As illustrated in FIG. 2, Gesture Processing Module 120 may examine Gesture Library 125 and determine that the user's motion (both fists coming together) translates to a request to "close tab", Gesture Processing Module 120 may replace the gesture with the instruction to close a tab and provide the instruction to Web Browser 130.

Figure 3:
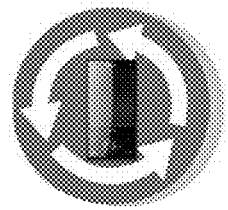
FIG. 3 is illustrates an alternate set of information in a translation store according to an embodiment of the present invention.
Figure 3:
Figure 3:
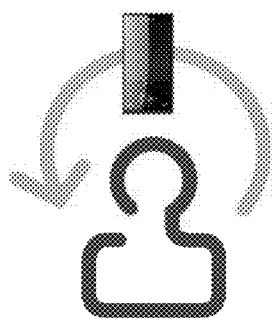

Similarly, FIG. 3 illustrates further examples of information in Gesture Library 125. In this example, a variety of actions detected by a camera and an accelerometer may be translated into gestures. Thus, if the user performs a swinging action that is detected by Accelerometer 110, the action may ultimately be passed on to Web Browser 125 as a request to page forward or backward, depending on the direction the user is swinging. In various embodiments of the invention, the list of gestures and translated action requests to Web Browser 125 may be a list which may be dynamically updated, either automatically according to predetermined criteria or manually, by application developers.

In addition to a gesture based input scheme for the new paradigm for manipulating web browsers, embodiments of the present invention additionally identify and expose a variety of possible actions within a web browser. Typical web pages viewed within a traditional PC-centric environment assume the presence of a mouse. Thus, for example, web pages often include "actionable areas" that are not immediately obvious to the user until the user performs an action within the area (e.g., hovers a mouse over the area). Once the web page detects the mouse hover, it may then display hidden text or actions that may be available to the user.

Figure 4:
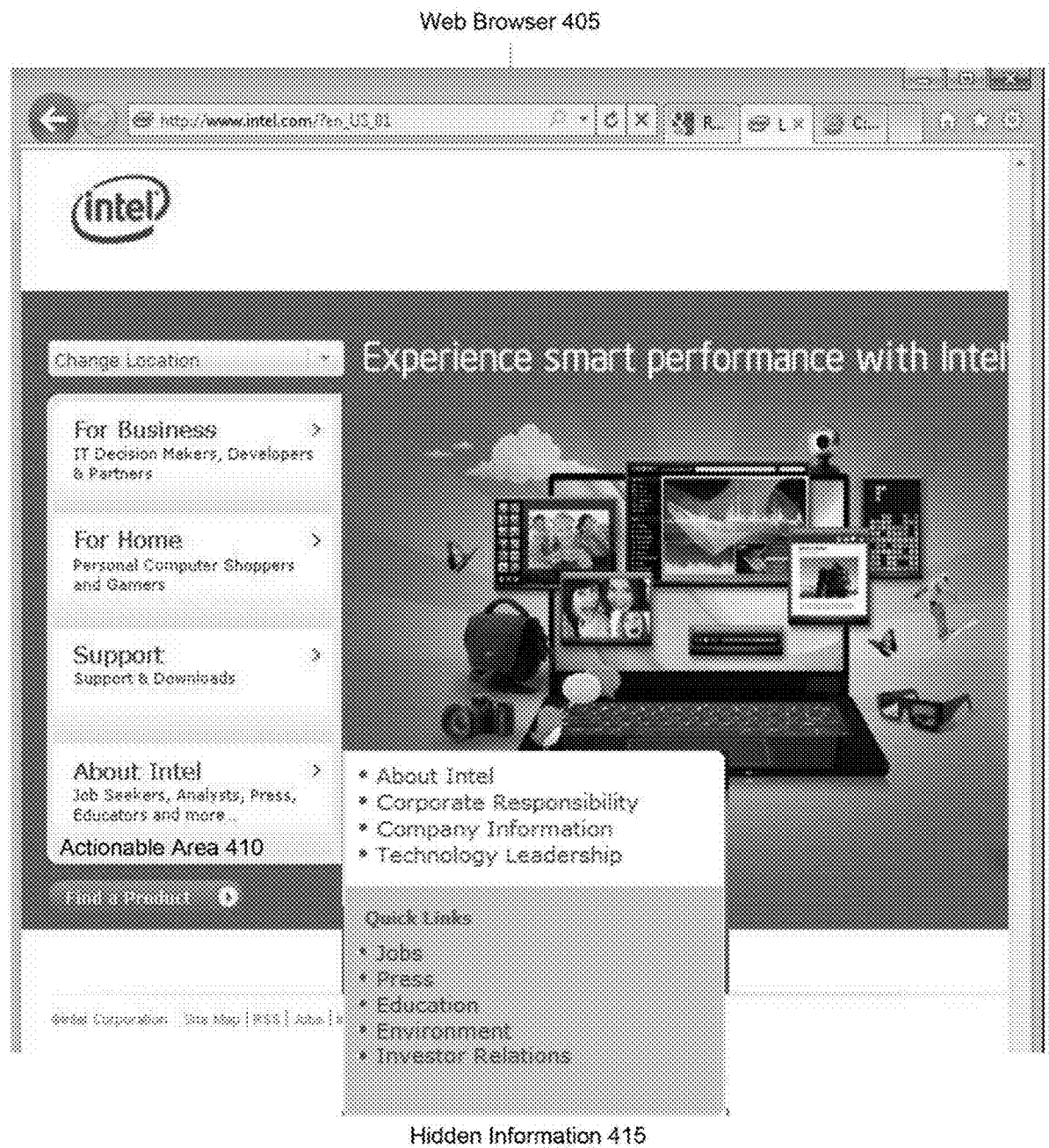
FIG. 4 illustrates an embodiment of the present invention.

FIG. 4 illustrates an example of one embodiment of the invention. As illustrated, applications ("Application 400") developed for traditional PC-centric web browsers ("Web Browsers 405") often employ a convention whereby when the positioning cursor is placed over an actionable area ("Actionable Area 410") of the graphical interface for a predetermined period of time, Application 400 may respond by displaying additional text (Hidden Text 415) that provides information pertaining to or related to the area. Thus, within this environment, once the user sees the hidden information revealed, the user may select one of the additional instructions for execution (e.g., by clicking on the "Corporate Responsibility" link revealed within Hidden Information 415, the user may be directed to a new web page.

On smaller form factor devices (e.g., MIDs), however, this type of functionality is typically not available. On touch based devices, for example, the lack of a positioning curser impedes the use of this technique. Even on handheld devices with input devices (e.g., a wand style TV remote), users have difficulty precisely positioning and holding a pointer on specific spots. As a result, web browser applications running on these platforms typically do not include this "actionable area" functionality.

According to embodiments of the present invention, web applications may provide the same functionality on all platforms. Embodiments of the present invention enable a new paradigm that exposes to a user one or more graphical user interface constructs that would otherwise be hard to identify and/or act upon on some device types. More specifically, instead of relying on the use of a positioning cursor to hover over actionable areas, one embodiment of the present invention may identify all actionable regions of Application 400 and provide a set of visual cues ("Visual Cues 415") that may be visible regardless of which platform Application 400 is running on. Visual Cues 415 may be customized for each platform, thus providing users with a significantly new and improved user interaction experience.

Figure 5B:
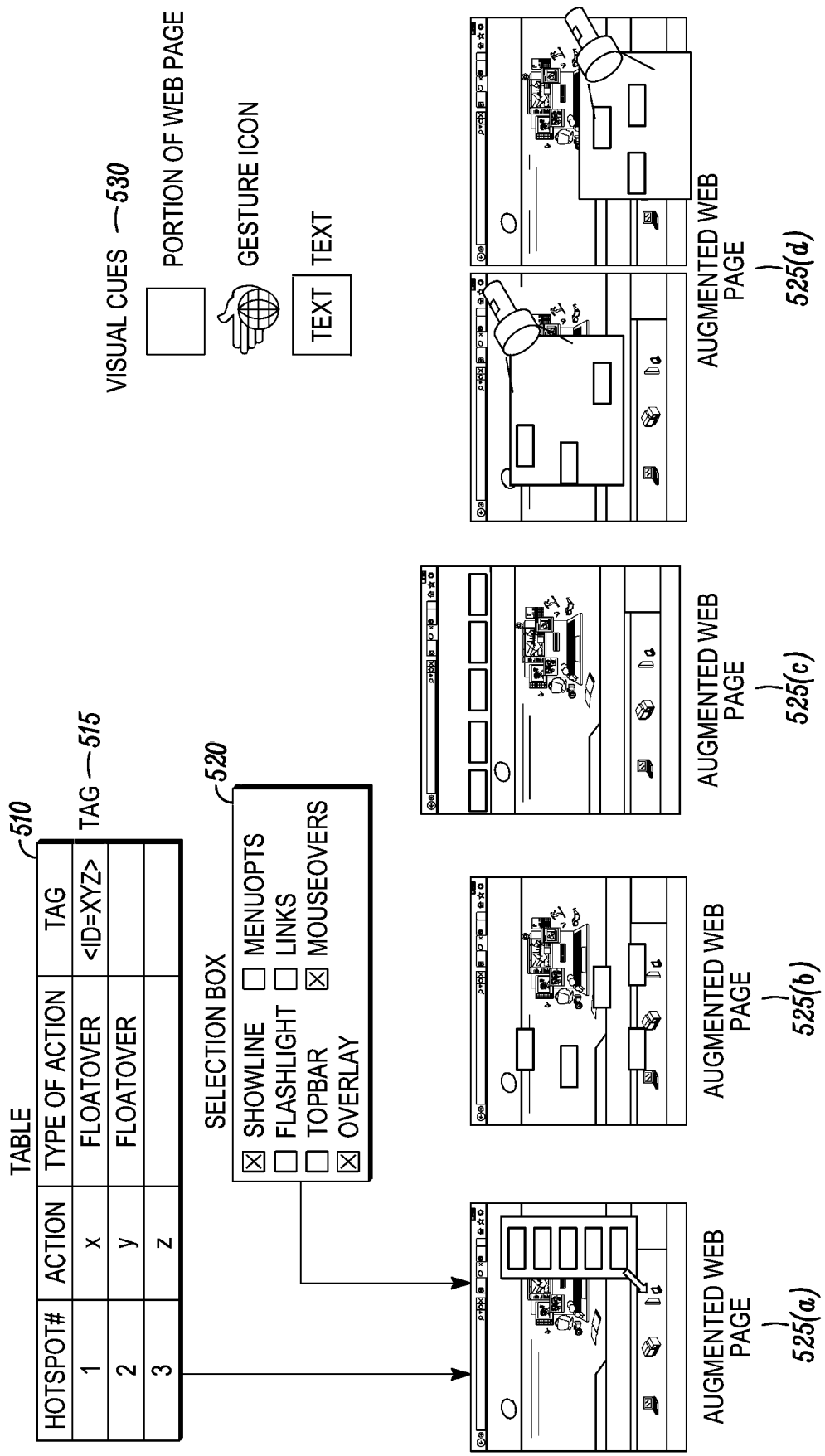
Figure 5C:
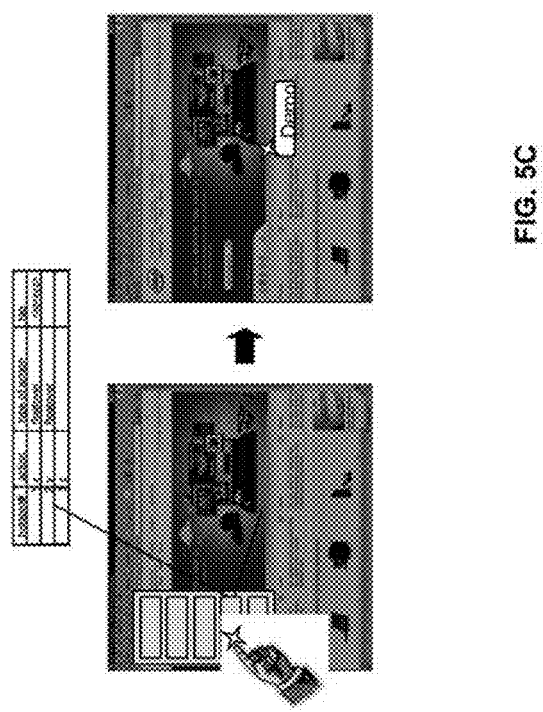

FIGS. 5A-5C illustrate an embodiment of the invention wherein visual cues may be used to further enhance the new paradigm for interacting with web browsers. For the purposes of this example, the user is assumed to be on a phone but embodiments of the invention may be implemented on a variety of devices as previously discussed. As illustrated in FIG. 5A, upon receipt of a web page (e.g., the Application 400 illustrated in FIG. 4) on a phone, the code for the web page (Code 500) may be parsed to Code Analyzer Module 500 which may determine that the web page includes actionable areas. It is well known in the art that web pages today are typically written in a markup language (e.g., HyperText Markup Language (HTML), HTML5, eXtensible HTML (XHTML), Extensible Markup Language (XML), etc.), and sometimes using a stylesheet language (e.g., Cascading Stylesheets (CSS)), a scripting language (e.g., ECMAScript, JavaScript, etc.), and/or a data interchange language (e.g., Java Script Object Notion (JSON), etc.). Web browsers typically rely on browser engines (also referred to as "rendering engines," "layout engines," or the like) (e.g., Trident/MSHTML for the Microsoft Internet Explorer browser, WebKit, Blink, Gecko, Quantum, etc.) to handle layout and rendering of GUI elements, engine enforce the security policy between documents, handle navigation through hyperlinks and data submitted through forms, and implements the DOM data structure exposed to page scripts. The browser engine may parse the language into a DOM data structure. Browsers also usually use a separate, dedicated scripting engine to execute scripts/code. The two engines work in concert via the shared DOM data structure. The DOM is a cross-platform and language-independent convention for representing and interacting with objects in HTML, XHTML and XML documents. Although described herein with respect to existing languages and conventions, embodiments of the invention are not so limited. It will be apparent to those of ordinary skill in the art that later developed web markup languages and/or conventions may be easily adapted to implement embodiments of the present invention.

Tags on a web page may be used by the DOM to determine the location of various items on a webpage (relative to other items). Thus, as illustrated, once Code Analyzer 505 identifies actionable areas on a web page, the information about the actionable areas may be consolidated. An example of the type of information collected and consolidated is illustrated in Table 510. Specifically, in this example, Code Analyzer 505 may identify 3 different actions (X, Y and Z), each corresponding to a specific action (e.g., "floatovers" as shown) and a tag for each action (e.g., <id=xyz> as illustrated). The term "floatover" as used in this example may be referred to by other terminology such as hover, mouse hover, mouse over, etc.

Once the actionable areas are identified as shown in FIG. 5A, FIG. 5B illustrates how embodiments of the present invention may present visual cues to a user. Specifically, as illustrated, in one embodiment, upon detecting that actionable areas exist on a web page, a user selection box (Selection Box 520) may be displayed. The user may select the types of actionable areas that he/she wishes to view. In one embodiment, the user may additionally utilize gestures to specify the types of actionable areas to select. According to this embodiment of the present invention, a user may not only provide input to the web application via gestures as previously described, it may additionally identify actionable areas within a web browser application without direct interaction. Thus, for example, each of the types of actionable items may be associated with a number and by holding up five fingers, for example, embodiments of the present invention may utilize that gesture to "select" the item associated with the number 5.

The selected types of actionable areas may then be displayed on Augmented Web Page 525 in a variety of ways. Various examples of Augmented Web Page 525 are illustrated here as Augmented Web page 525 (*a*)-(*d*) but embodiments of the invention are not so limited. Augmented Web Page 525 (*a*), for example, may include an overlay listing in the form of a side menu of all the action items available to the user within Actionable Area 410. Alternatively, these items may be displayed in a variety of other ways without departing from the spirit of embodiments of the invention.

The actual display of the menu items and/or displayed actions may be any type of visual cue (Visual Cues 530) that is appropriate for the device on which the user is reading the web page. In this example of a phone, given the small display screen, Visual Cue 510 may be represented by text for a link. Alternatively, the user may be presented with an icon indicative of a gesture the user may use to activate the link. In yet another embodiment, the user may simply be presented with a portion of the web page that is active and available for selection.

According to an embodiment of the invention, once the user is able to view Visual Cues 510 and realizes that there is are selectable, actionable areas on the page, the user may select Visual Cue 510 as illustrated in FIG. 5C. In one embodiment of the invention, the user may utilize a gesture (e.g., index finger pointed forward, indicating "select link") to follow a link. As previously discussed, this gesture may be captured, identified and processed and the user's input may then be routed to the web browser's user interface as input. The user may then be presented with a demo of a product (as specified by the link).

Figure 6A:
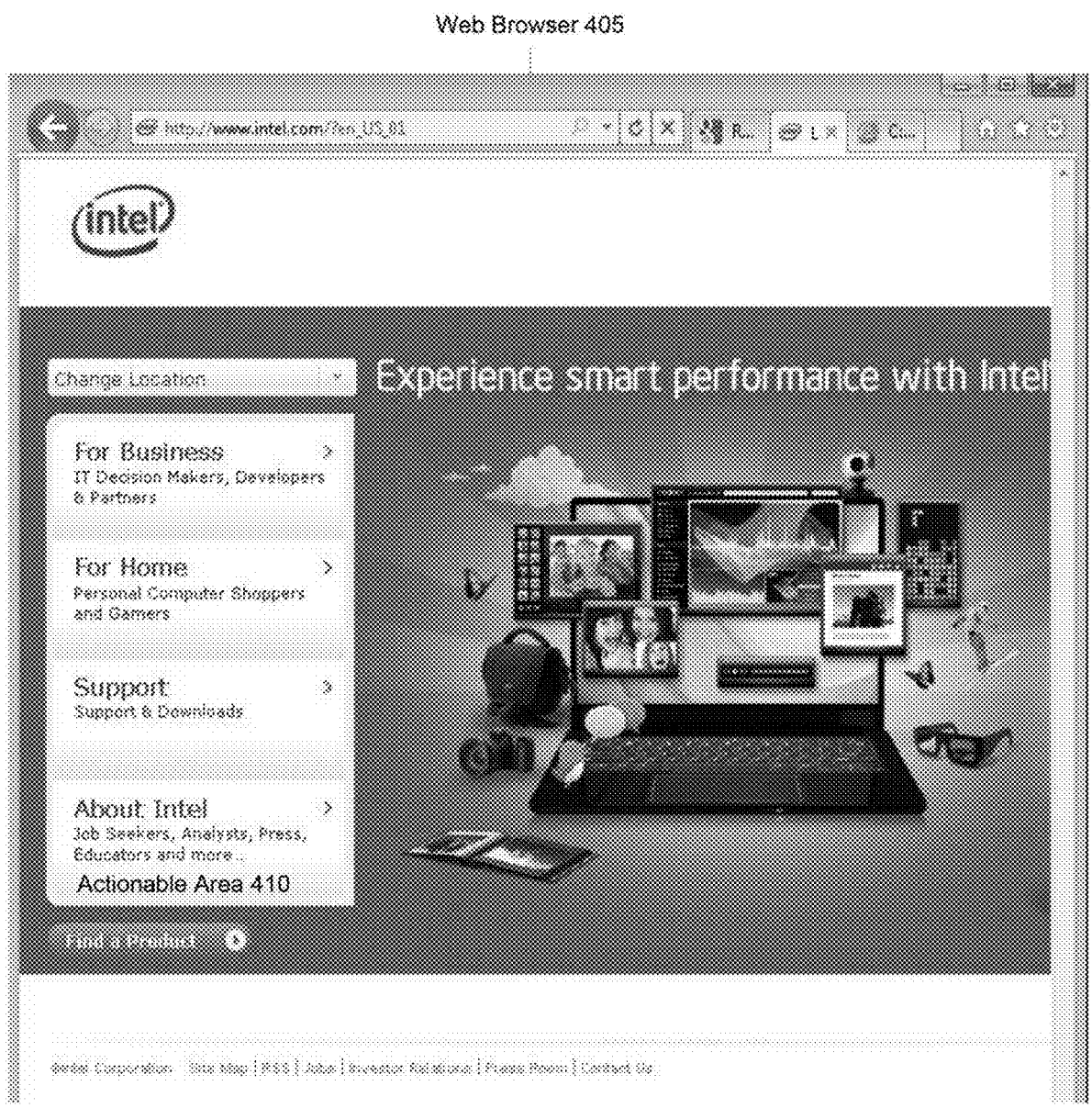
FIGS. 6A-6C illustrate an embodiment of the present invention.
Figure 6B:
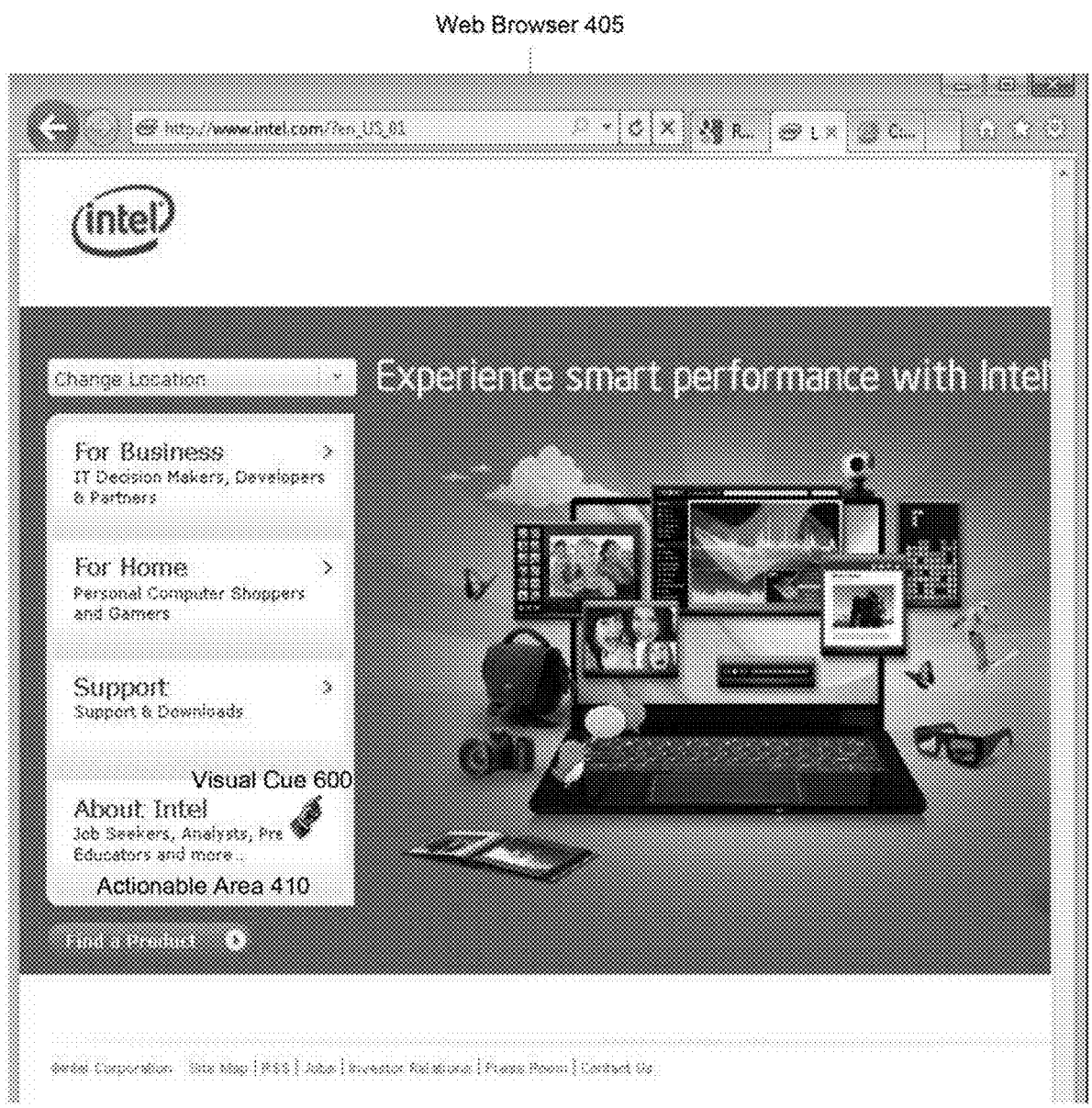
Figure 6C:
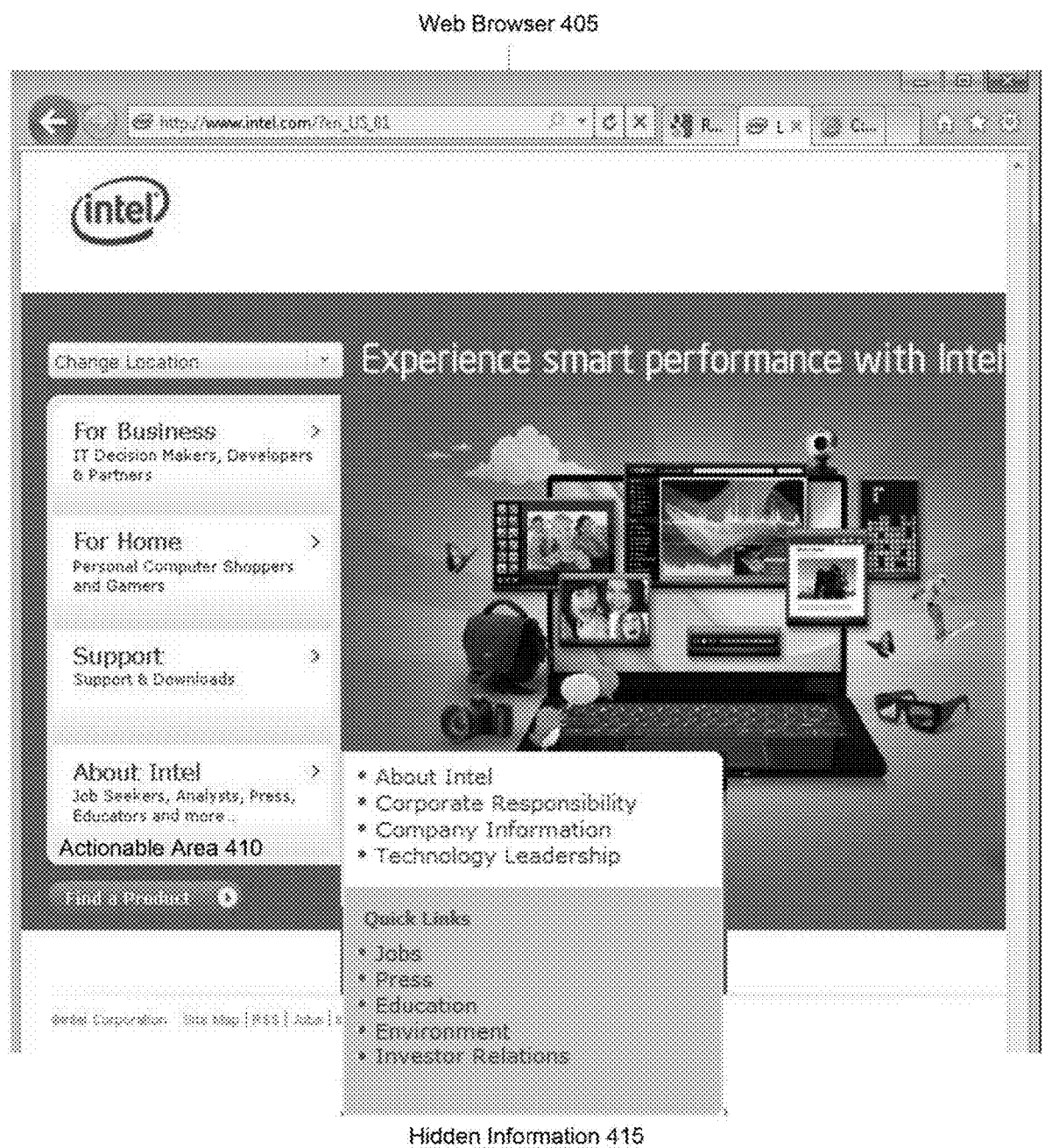

FIGS. 6A-C illustrate an embodiment of the invention. Specifically, as illustrated, going back to the example of FIG. 4 in which Actionable Area 410 is displayed on a web page within Web Browser 405. The displayed web page may be a display of a web application that runs on any platform, regardless of input devices and/or user interfaces. According to an embodiment, the displayed web page may include Actionable Area 410, which displays Hidden Information 415 when a cursor hovers over the area (illustrated in FIG. 4). Upon analysis and determination that there is an actionable area on the page, according to embodiments of the invention, a visual cue (Visual Cue 600) may appear to represent Actionable Area 400.

In the present example, Visual Cue 600 is an icon of an index finger pointing forward. As previously discussed, Visual Cue 600 may also be presented in other formats without departing from embodiments of the present invention. With the use of the gesture icon here, the user now knows that he/she can make the gesture in order to select Actionable Area 410. When a user selects the Visual Cue 600 via any input means, the action may be interpreted as a gesture from the user. Alternatively, in one embodiment, the user may make the gesture shown in the icon, and as described above, once the gesture is captured and determined to be input, the gesture may be passed on to Gesture Processing Module 120. In either scenario, the user's motion may be translates to a request to "follow link", Upon receipt of the instruction, Web Browser 130 may follow the link as illustrated in FIG. 6C, thus bringing up the entire list of items that was previously unavailable to the user's view.

Figure 7:
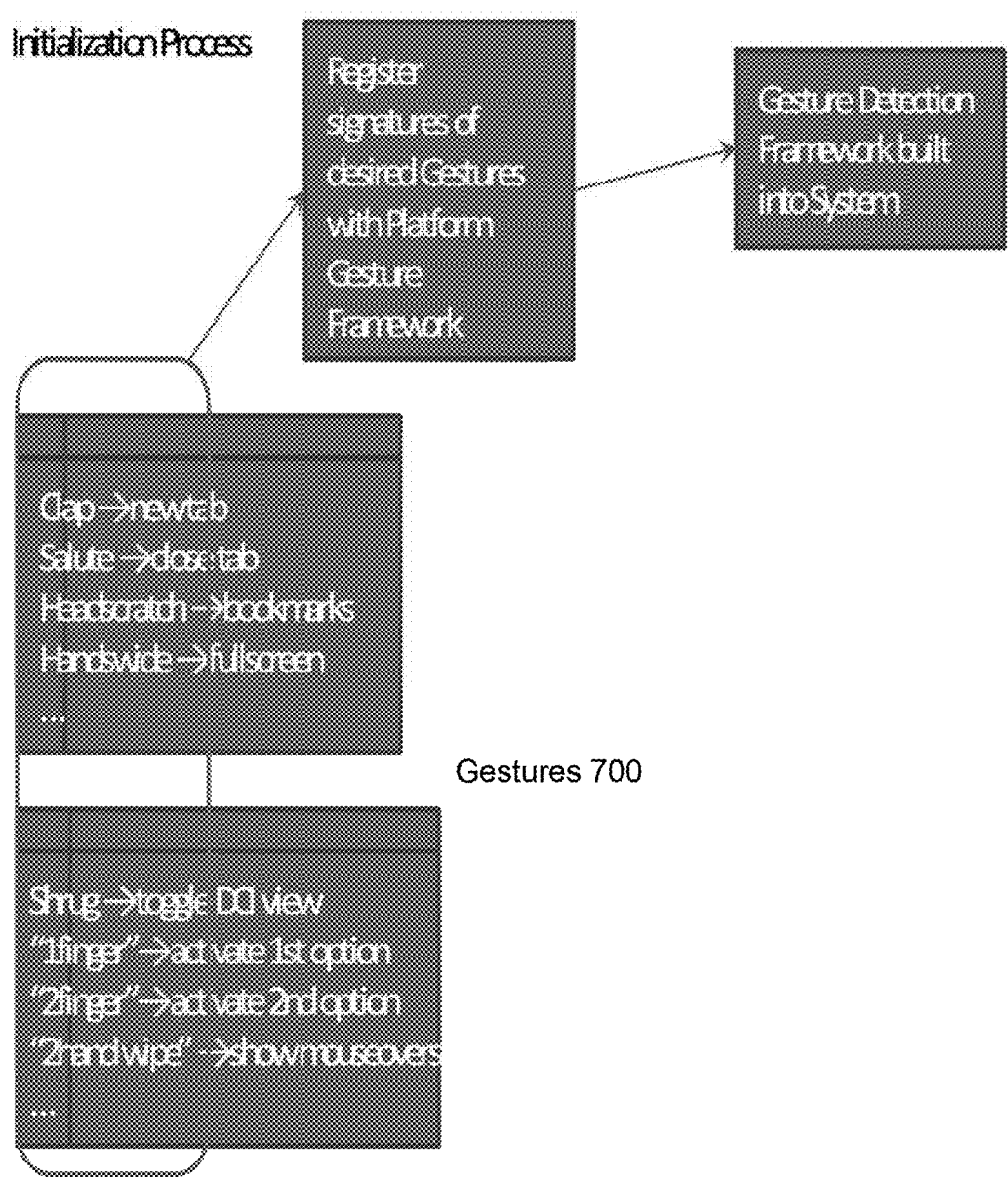
FIG. 7 illustrates an example of an initialization according to embodiments of the present invention.

FIG. 7 illustrates an initialization process according to one embodiment of the present invention. Specifically, as illustrated, a variety of gestures (browser gestures or visual cue gestures) may be registered with the platform's gesture framework. Gesture frameworks are well known to those of ordinary skill in the art and detailed description thereof is omitted herein in order not to obscure embodiments of the present invention. Once registered, these gestures may become part of the gesture recognition framework and may be accessed thereafter when the platform receives a motion that is deemed to be a gesture.

Figure 8:
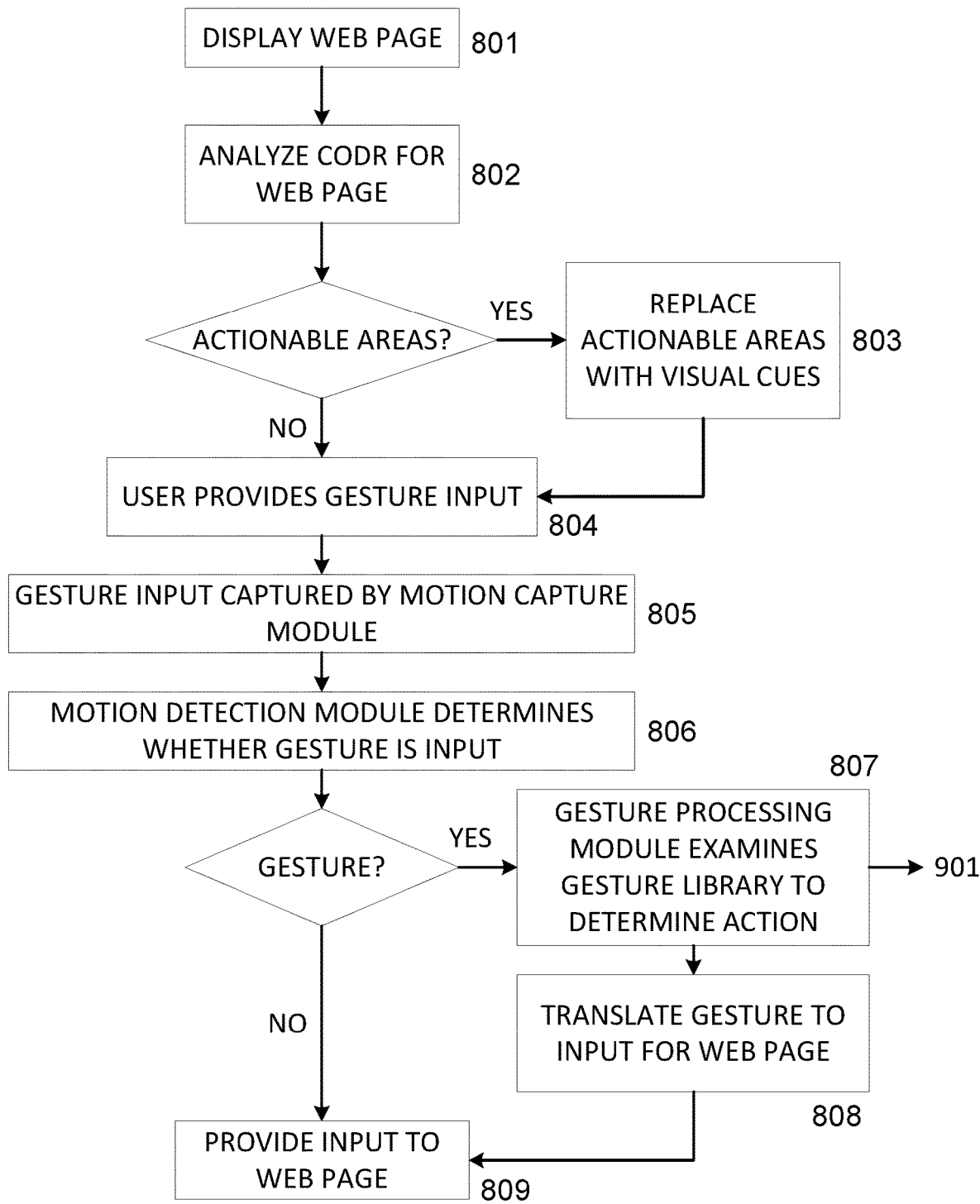
FIG. 8 is a flow chart illustrating an embodiment of the present invention.

FIG. 8 is a flow chart illustrating one embodiment of the present invention. Although the following operations may be described as a sequential process, many of the operations may in fact be performed in parallel and/or concurrently. In addition, in one or more embodiments, the order of the operations may be re-arranged without departing from the spirit of embodiments of the invention. In 701, a web page may be displayed on a device. The code for the web page may be analyzed in 702 to determine whether any actionable areas exist on the page. If they do, in 703, in one embodiment of the invention, the actionable areas may be replaced by visual cues. The user may interact with the web page by making a gesture in 704. The user's gesture may be captured by a motion capture module in 705. Once captured, the motion capture module may provide the movement to a gesture detection module in 705 to determine whether the motion is an action or is to be interpreted as input. If identified as input from the user, the gesture detection module may pass the action on to the gesture processing module in 706. The gesture detection module may examine a gesture library in 707 to determine the meaning of the user's gesture. Once the gesture is identified and translated to input for the web browser in 708, the gesture processing module may provide the input to the web browser in 709.

Figure 9:
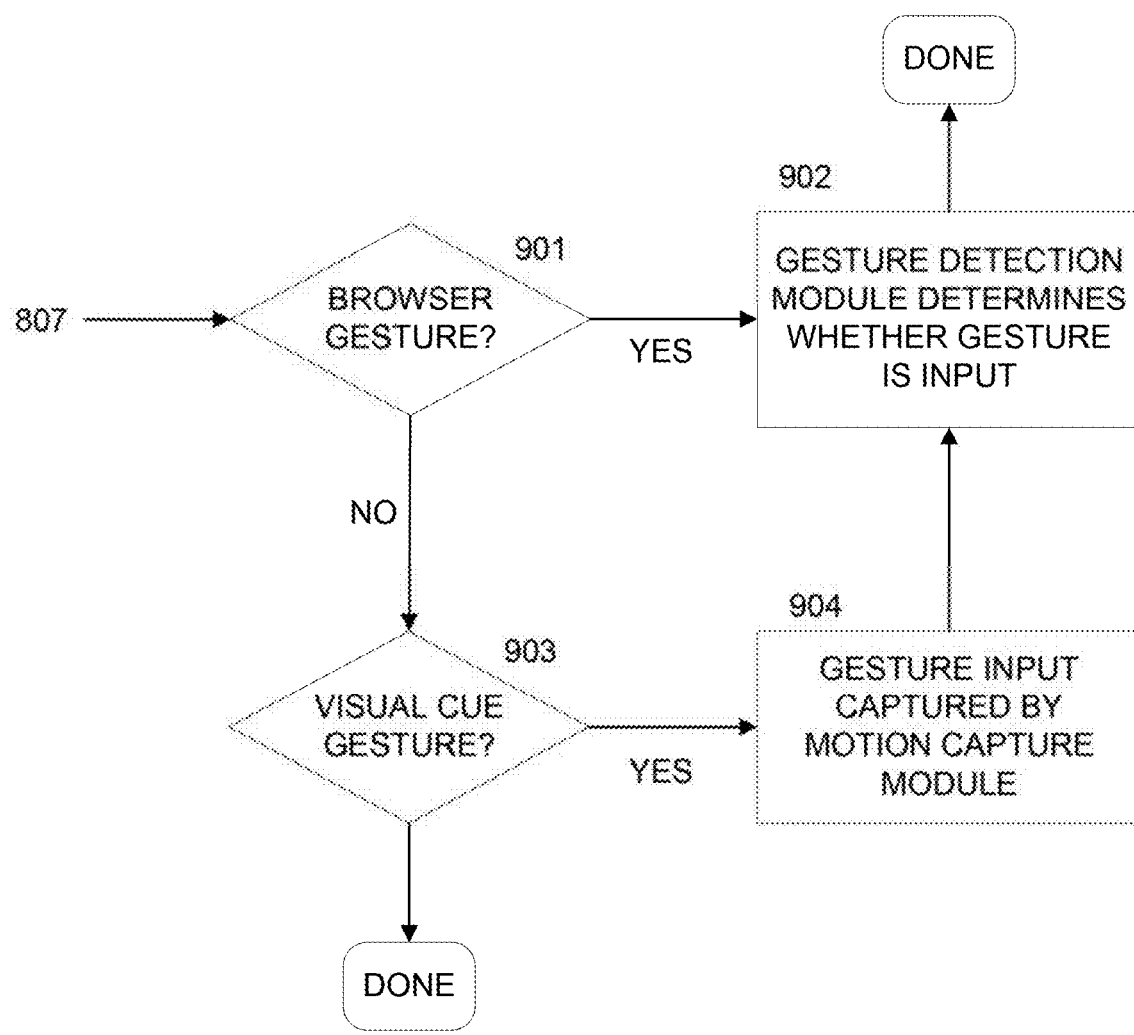
FIG. 9 is a flow chart illustrating an embodiment of the present invention.

FIG. 9 is a flow chart illustrating further how the gesture processing module examines the gesture library in step 707 above according to one embodiment of the present invention. Although the following operations may be described as a sequential process, many of the operations may in fact be performed in parallel and/or concurrently. In addition, in one or more embodiments, the order of the operations may be re-arranged without departing from the spirit of embodiments of the invention. As illustrated, gesture processing module examines the gesture library in 707 to determine an action by determining in 801 whether the browser is a browser gesture. If it is, then in 802, the motion detection module determines whether the gesture should be interpreted as input. If the gesture is not a browser gesture in 801, however, then the gesture may be examined in 803 to determine if it is a visual cue gesture that shows hidden items on a web page. Thus, for example, the gesture may be examined to determine whether it is a gesture to identify actionable areas, to select an item in an actionable area and/or to perform any other actions on the "hidden" items. If the gesture is determined to be a visual cue gesture, the gestured input may be captured by the motion capture module, then processed in 802 to determine whether the gesture is input.

Figure 10:
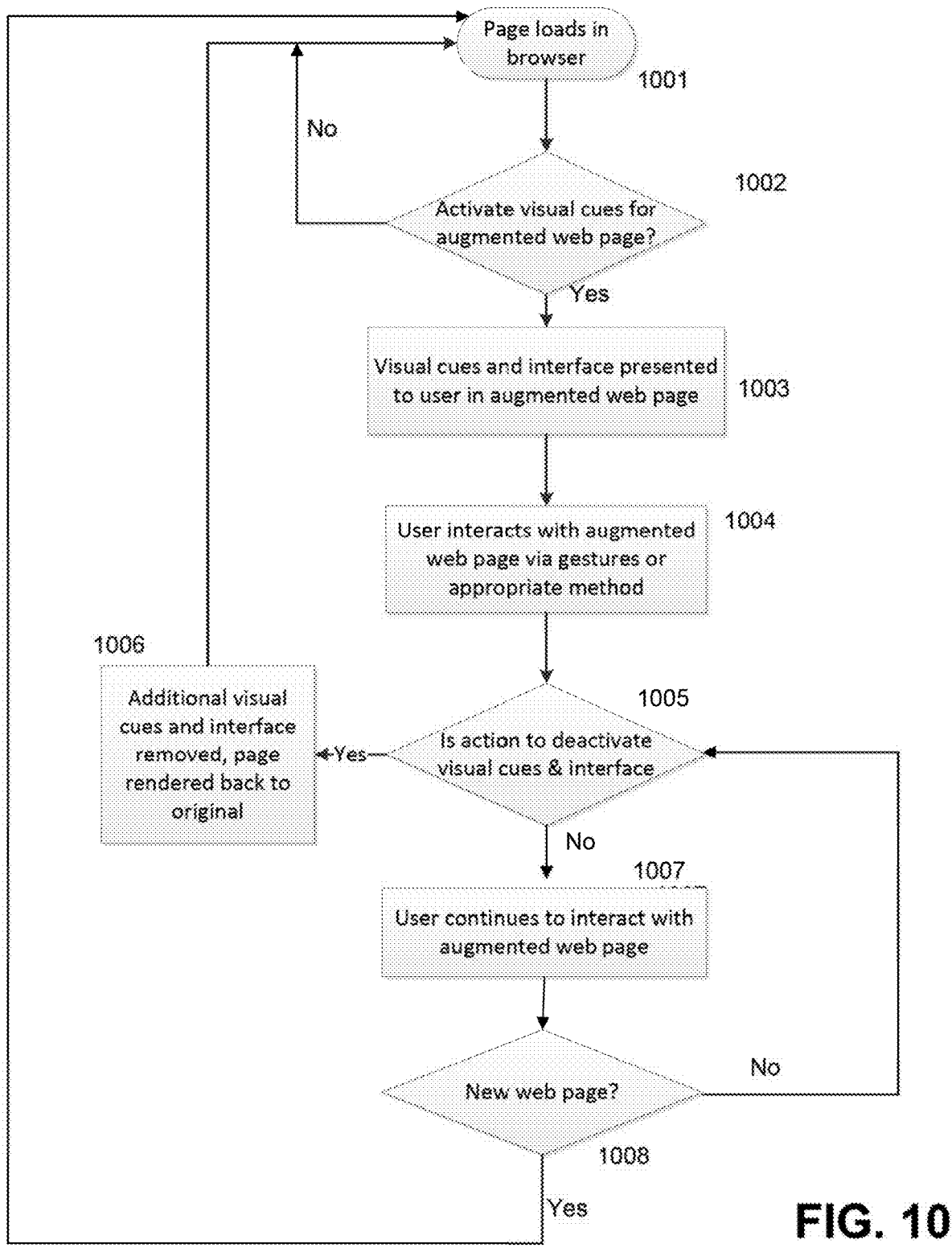
FIG. 10 is a flow chart illustrating an embodiment of the present invention.

FIG. 10 is a flow chart illustrating further visual cues may be implemented according to embodiments of the present invention. Although the following operations may be described as a sequential process, many of the operations may in fact be performed in parallel and/or concurrently. In addition, in one or more embodiments, the order of the operations may be re-arranged without departing from the spirit of embodiments of the invention. In 1001, a web browser may load a web page on a platform. According to one embodiment of the invention, if the platform is configured in 1002, in 1003 the user may be presented with the appropriate visual cues and the augmented web page. Otherwise, if the platform is not configured for visual cues, the web page may continue to be displayed without visual cues.

The user may continue to interact with the augmented web page in 1004. The user's input may be examined in 1005 to determine whether the user is attempting to deactivate the visual cues and augmented interface. If the user input is to deactivate the visual cues, in 1006, the visual cues and interface may be removed and the web page may be rendered back to the original page. If no such input is received, the user may continue to interact with the augmented web page in 1007 until a new web page is loaded in 1008.

The scheme according to embodiments of the present invention may be implemented on a variety of computing devices. According to an embodiment, a computing device may include various other well-known components such as one or more processors which can be Reduced Instruction Set Computer (RISC) engines or specialized processing engines such as Graphical Processing Units (GPUs)s, Digital Signal Processing units (DSPs) or embedded microcontrollers.

The processor(s) and machine-accessible storage media may be communicatively coupled using a bridge/memory controller, and the processor may be capable of executing instructions stored in the machine-accessible storage media. Machine-accessible storage media herein may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The bridge/memory controller may be coupled to a graphics controller, and the graphics controller may control the output of display data on a display device. The display device may include a touch-sensitive display device (also referred to herein as a "touchscreen") which may be implemented using any suitable touch-sensitive technology such as, for example and without limitation, capacitive, resistive, surface acoustic wave (SAW), infrared, and optical imaging. Touch-sensitive display device for one embodiment may be implemented using any suitable multi-touch technology. Touch-sensitive display device includes a display that may be implemented using any suitable display technology, such as that for a liquid crystal display (LCD) for example. System control logic for at least one embodiment may include one or more graphics controllers to provide one or more display interfaces to touch-sensitive display device.

The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including Ethernet, Gigabit Ethernet, PCI, PCI Express, FireWire. Bluetooth, WiFi, infrared and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A computer system comprising:
   at least one display device;
   one or more processors communicatively coupled with one or more cameras and the at least one display device; and
   one or more machine-accessible storage media coupled with the one or more processors,
   wherein the one or more processors are to execute instructions stored by the one or more machine-accessible storage media to:
   identify an actionable area of a webpage within the webpage;
   display an icon for the actionable area, the icon representing a gesture to be performed to activate the actionable area, and
   activate the actionable area in response to detection of performance of the gesture by a user to select the displayed icon.

2. The computer system of claim 1, wherein the webpage is a first webpage and the actionable area corresponding to the selected icon is a link to a second webpage, and wherein, to cause to activate the actionable area, the one or more processors are to execute the instructions to:
   activate the link to the second webpage in response to determination that the gesture is for selection of the selected icon.

3. The computer system of claim 1, wherein the one or more processors are to execute instructions to cause a web browser to render the webpage with the icon of the actionable area overlaid on the actionable area.

4. The computer system of claim 1, wherein, to display the icon for the actionable area, the one or more processors are to execute the instructions to:
   display the icon on or adjacent to the corresponding actionable area to indicate a position of the corresponding actionable area within the webpage.

5. The computer system of claim 1, wherein the computer system further comprises one or more cameras, and the one or more processors are to execute the instructions to:

identify, from a motion data stream generated by the one or more cameras, the gesture performed by the user to select the displayed icon.

6. The computer system of claim 5, wherein, to activate the actionable area, the one or more processors are to execute the instructions to:
cause performance of an action of the actionable area corresponding to the selected icon in response to identification of the gesture.

7. The computer system of claim 6, wherein, to activate the actionable area, the one or more processors are to execute the instructions to:
translate the gesture for selection of the icon into an input for a web browser that renders and displays the webpage; and
provide the input to the web browser.

8. The computer system of claim 5, wherein the gesture for selection of the displayed icon is a hand grab motion.

9. The computer system of claim 1, wherein, to identify the actionable area within the webpage, the one or more processors are to execute the instructions to:
obtain program code of the webpage; and
identify a tag within the program code that defines the actionable area.

10. The computer system of claim 1, further comprising:
a network interface communicatively coupled with the one or more processors, the network interface to receive program code used to generate the webpage.

11. One or more non-transitory computer-readable media (NTCRM) comprising instructions, wherein execution of the instructions by one or more processors is to cause a computer device to:
identify actionable areas of a webpage within the webpage;
display the webpage with an icon for each identified actionable area of the actionable areas,
each icon representing a gesture to be performed to activate a corresponding actionable area; and
activate an actionable area of the actionable areas in response to detection of a gesture performed by a user to select an icon corresponding to the actionable area to be activated.

12. The one or more NTCRM of claim 11, wherein the webpage is a first webpage and the actionable area corresponding to the selected icon is a link to a second webpage, and wherein, to cause to activate the actionable area, the one or more processors are to execute the instructions to:
activate the link to the second webpage in response to determination that the gesture is for selection of the selected icon.

13. The one or more NTCRM of claim 11, wherein the one or more processors are to execute instructions to cause a web browser to render the webpage with each icon overlaid on the corresponding actionable area.

14. The one or more NTCRM of claim 11, wherein, to display the icon for the actionable area, the one or more processors are to execute the instructions to:
display each icon on or adjacent to the corresponding actionable area to indicate a position of the corresponding actionable area within the webpage.

15. The one or more NTCRM of claim 11, wherein the computer system further comprises one or more cameras, and the one or more processors are to execute the instructions to:
identify, from a motion data stream generated by the one or more cameras, the gesture performed by the user to select the displayed icon.

16. The one or more NTCRM of claim 15, wherein, to activate the actionable area, the one or more processors are to execute the instructions to:
cause performance of an action of the actionable area corresponding to the selected icon in response to identification of the gesture.

17. The one or more NTCRM of claim 16, wherein, to activate the actionable area, the one or more processors are to execute the instructions to:
translate the gesture for selection of the icon into an input for a web browser that renders and displays the webpage; and
provide the input to the web browser.

18. The one or more NTCRM of claim 15, wherein the gesture for selection of the displayed icon is a hand grab motion.

19. The one or more NTCRM of claim 11, wherein, to identify the actionable area within the webpage, the one or more processors are to execute the instructions to:
obtain program code of the webpage; and
identify a tag within the program code that defines each identified actionable area.

20. The one or more NTCRM of claim 19, wherein the program code of the webpage is formed using a markup language or a scripting language.

21. A method of operating a computer device, the method comprising:
identifying, by the computer device, actionable areas of a webpage within the webpage;
displaying, by the computer device, the webpage with an icon for each identified actionable area of the actionable areas,
each icon representing a gesture to be performed to activate a corresponding actionable area; identifying, by the computer device,
the gesture performed by a user to select one of the displayed icons corresponding to one of the actionable areas from a motion data stream generated by the one or more cameras; and
activating, by the computer device, the one of the actionable areas in response to detecting the gesture performed by the user.

22. The method of claim 21, wherein the webpage is a first webpage and the actionable area corresponding to the selected icon is a link to a second webpage, and wherein activating the one of the actionable areas comprises:
activating the link to the second webpage in response to determining that the gesture is for selection of the selected icon.

23. The method of claim 21, wherein displaying the webpage comprises:
displaying each icon overlaid on or adjacent to the corresponding actionable area to indicate a position of the corresponding actionable area within the webpage.

24. The method of claim 21, wherein activating the one of the actionable areas comprises:
translating the detected gesture into an input to a client application; and
providing the input to the client application for execution.

25. The method of claim 21, wherein identifying the one of the actionable areas within the webpage comprises:
obtaining program code of the webpage; and
identifying a tag within the program code that defines each identified actionable area.

* * * * *

UNITED STATES PATENT AND TRADEMARK OFFICE
CERTIFICATE OF CORRECTION

| | | |
|---|---|---|
| PATENT NO. | : 11,204,650 B2 | Page 1 of 1 |
| APPLICATION NO. | : 17/067340 | |
| DATED | : December 21, 2021 | |
| INVENTOR(S) | : Christopher L. Elford et al. | |

It is certified that error appears in the above-identified patent and that said Letters Patent is hereby corrected as shown below:

In the Claims

Column 10
Line 43, "actionable area, and" should read "actionable area; and"

Column 12
Line 31-41, "...displaying, by the computer device, the webpage with an icon for each identified actionable area of the actionable areas,
　　each icon representing a gesture to be performed to activate a corresponding actionable area; identifying, by the computer device,
　　the gesture performed by a user to select one of the displayed icons corresponding to one of the actionable areas from a motion data stream generated by the one or more cameras; and" should read "...displaying, by the computer device, the webpage with an icon for each identified actionable area of the actionable areas, each icon representing a gesture to be performed to activate a corresponding actionable area;
　　identifying, by the computer device, the gesture performed by a user to select one of the displayed icons corresponding to one of the actionable areas from a motion data stream generated by the one or more cameras; and"

Signed and Sealed this
Twenty-third Day of May, 2023

Katherine Kelly Vidal
*Director of the United States Patent and Trademark Office*